(12) United States Patent
Danger

(10) Patent No.: US 6,959,468 B1
(45) Date of Patent: Nov. 1, 2005

(54) VENT ADJUSTING APPARATUS

(76) Inventor: Sandra J. Danger, 57222 County Rd. 653, Paw Paw, MI (US) 49079

(*) Notice: Subject to any disclaimer, the term of this patent is extended or adjusted under 35 U.S.C. 154(b) by 0 days.

(21) Appl. No.: 10/877,436

(22) Filed: Jun. 28, 2004

(51) Int. Cl.[7] ............................................. B60H 1/34
(52) U.S. Cl. ........................... 16/426; 16/412; 16/413; 454/155; 454/152; 454/314; 454/335; 454/367
(58) Field of Search ........................ 16/426, 412, 413; 454/155, 152, 314, 335, 367

(56) References Cited

U.S. PATENT DOCUMENTS

| | | | |
|---|---|---|---|
| 2,884,005 A | * | 4/1959 | Honerkamp et al. ... 137/601.04 |
| 4,203,332 A | | 5/1980 | Corsetti |
| 4,686,892 A | * | 8/1987 | Foster ........................ 454/313 |
| 5,016,504 A | | 5/1991 | Brunetto et al. |
| 5,393,262 A | * | 2/1995 | Hashimoto et al. ......... 454/155 |
| 5,951,074 A | | 9/1999 | Guzzi et al. |
| D424,896 S | | 5/2000 | Christian Jr. |
| 6,199,456 B1 | | 3/2001 | Hlady |
| 6,464,579 B1 | | 10/2002 | Salazar |
| 6,736,719 B1 | * | 5/2004 | Gehring et al. ............. 454/155 |

* cited by examiner

Primary Examiner—Brian E. Glessner
Assistant Examiner—Mark Williams

(57) ABSTRACT

A vent adjusting apparatus for opening and closing air vents of a recreational vehicle includes a handle provided with a first adapter attached to one end portion thereof. The first adapter includes a groove that has first and second bores oppositely spaced for engaging a portion of an air vent and rotating same in a selected radial path. A second adapter is attached to an opposite end of the handle and includes protrusions for engaging an alternate air vent design. The top surface of the second adaptor includes a bore that is in continuous contact with the second adapter receptacle for securely maintaining the handle secured thereto. In an alternate embodiment, the handle may include a telescopic portion for adjusting a length thereof as desired by a user.

15 Claims, 4 Drawing Sheets

US 6,959,468 B1

VENT ADJUSTING APPARATUS

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a wrench and, more particularly, to a wrench adapted for opening vehicle air vents.

2. Prior Art

The use of ventilation systems is known in the prior art. More specifically, ventilation systems heretofore devised and utilized for the purpose of controlling the discharge of air are known to consist basically of familiar, expected and obvious structural configurations, notwithstanding a myriad of designs, which have been developed for the fulfillment of countless objectives and requirements.

In the past, when a person desired to adjust an air vent, he/she would usually stand on a chair and move the shutters with his hand, since the vent is usually located high on a wall or in the ceiling. In the case of a recreation vehicle a fresh air vent is commonly located on the roof of the vehicle. Adjusting such vents requires the use of a stepladder. This practice has resulted in numerous accidents, due to people standing on chairs or other unstable pieces of furniture while adjusting the air vent.

Accordingly, a need remains for a tool designed to open air vents that is easy to use and convenient. The present invention satisfies such a need by providing easy access to a vent for quick adjustment, thereby eliminating the need for a bulky stepladder. By applying manual force, an individual can safely and easily open a vent using the present invention while simplifying vehicle operations for the owner and allowing for proper ventilation of the interior of the vehicle. In addition to the above advantages, the lightweight nature of the present invention allows users of any age to operate it.

BRIEF SUMMARY OF THE INVENTION

In view of the foregoing background, it is therefore an object of the present invention to provide a hand-operable vent adjusting apparatus. These and other objects, features, and advantages of the invention are provided by an apparatus preferably formed from non-corrosive material for opening and closing fresh air vents of a recreational vehicle. In a preferred embodiment, such an apparatus includes a unitary elongated handle that has a centrally disposed longitudinal axis and opposed end portions. In an alternate embodiment, the handle preferably includes a telescopic portion slidably engageable along the axis.

Such a telescopic portion includes a fastening member radially spaced about the axis and selectively rotatable between clockwise and counterclockwise directions for tightening and loosening the telescopic portion respectively.

Advantageously, the present invention further includes a first adapter provided with a substantially planar bottom surface and a plurality of sidewalls integral therewith and extending vertically therefrom. Such a bottom surface has an aperture formed therein for securely receiving one opposed end portion of the elongated handle.

The first adapter further has a top surface provided with a groove formed substantially medially of the plurality of sidewalls and extending along a partial length of the first adapter. Such a groove is sloped at a predetermined angle and extends downwardly and away from the handle. Of course, the groove slope may be selectively adjusted without materially affecting the scope of the present invention.

Furthermore, the groove has a first bore formed therein and extending substantially parallel to the axis and downwardly from the first adapter wherein the first bore is in continuous contact medially of the bottom surface and the aperture. The groove further has a second bore oppositely spaced from the first bore and extending substantially parallel thereto wherein the second bore passes through the bottom surface of the first adapter for engaging a select portion of an air vent during operating conditions.

The present invention further includes a second adapter that has a substantially planar top surface and a plurality of sidewalls integral therewith and extending vertically therefrom. Such a top surface is provided with an aperture formed substantially medially therein for securely receiving another handle end portion.

The second adapter further has a bottom surface including a plurality of protrusions extending downwardly therefrom. Such a plurality of protrusions are oppositely spaced from the axis for selectively engaging another portion of an air vent during operating conditions. The plurality of protrusions may have a substantially convex shape corresponding to a plurality of intrusions of a recreational vehicle fresh air vent, wherein the plurality of protrusions each have an arcuate apex subjacent the handle. Of course, such protrusions may be sized and shaped to accommodate a variety of vehicle air vents, as well known to a person of ordinary skill in the art.

The top surface further includes a bore formed substantially medially therein and extending substantially vertically, wherein the top surface bore is in continuous contact with the second adapter receptacle.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
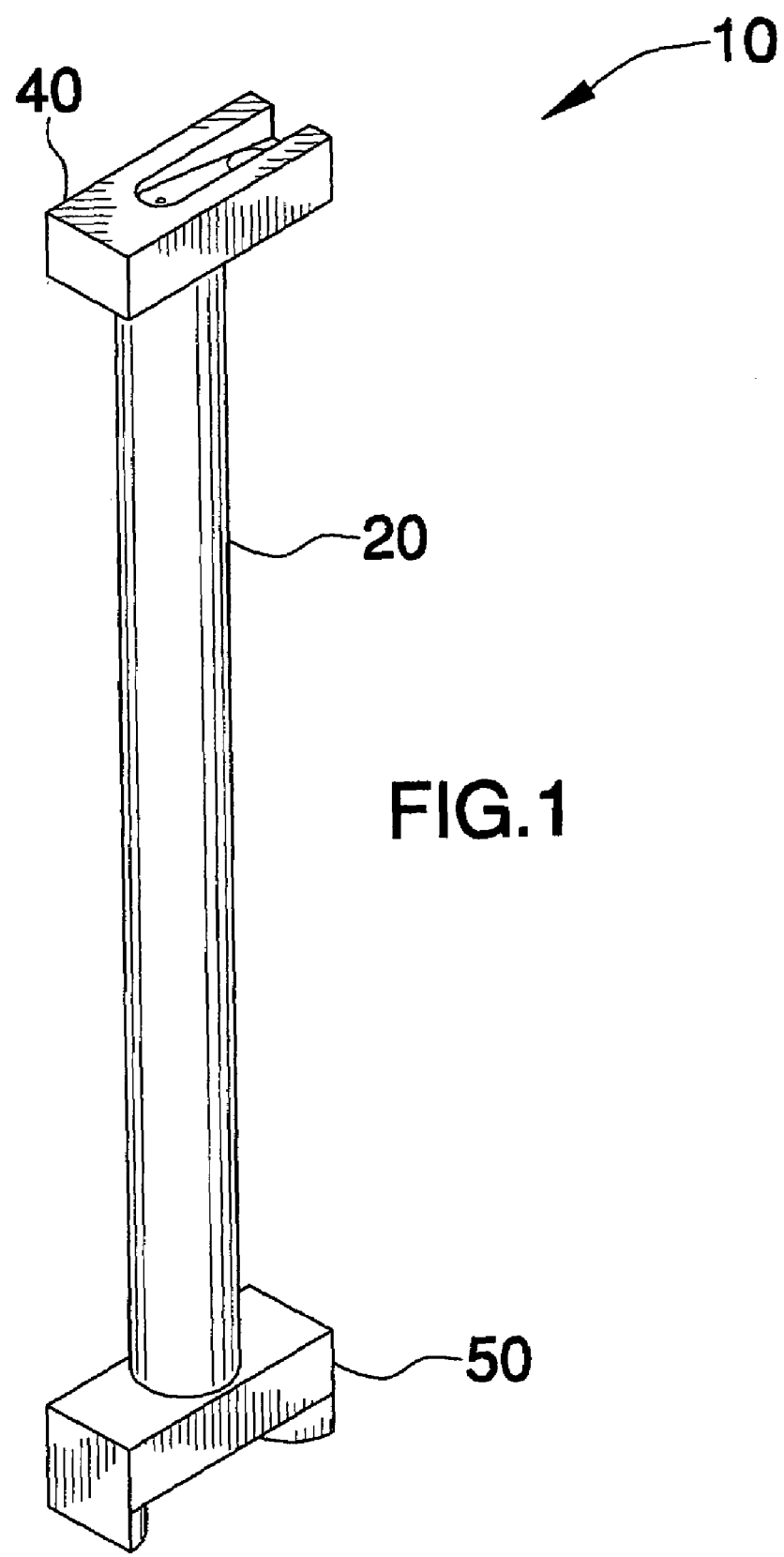
FIG. 1 is a perspective view showing a preferred embodiment of the vent-adjusting wrench, in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements throughout the figures. Prime/double prime notations refer to alternate embodiments of like elements.

The apparatus of this invention is referred to generally in FIGS. 1–8 by the reference numeral 10 and is intended to assist a user in opening and closing air vents of a recreational vehicle. It should be understood that the apparatus 10 may be used to adjust air vents in a variety of vehicles and dwellings without departing from the true scope of the invention.

Figure 8:
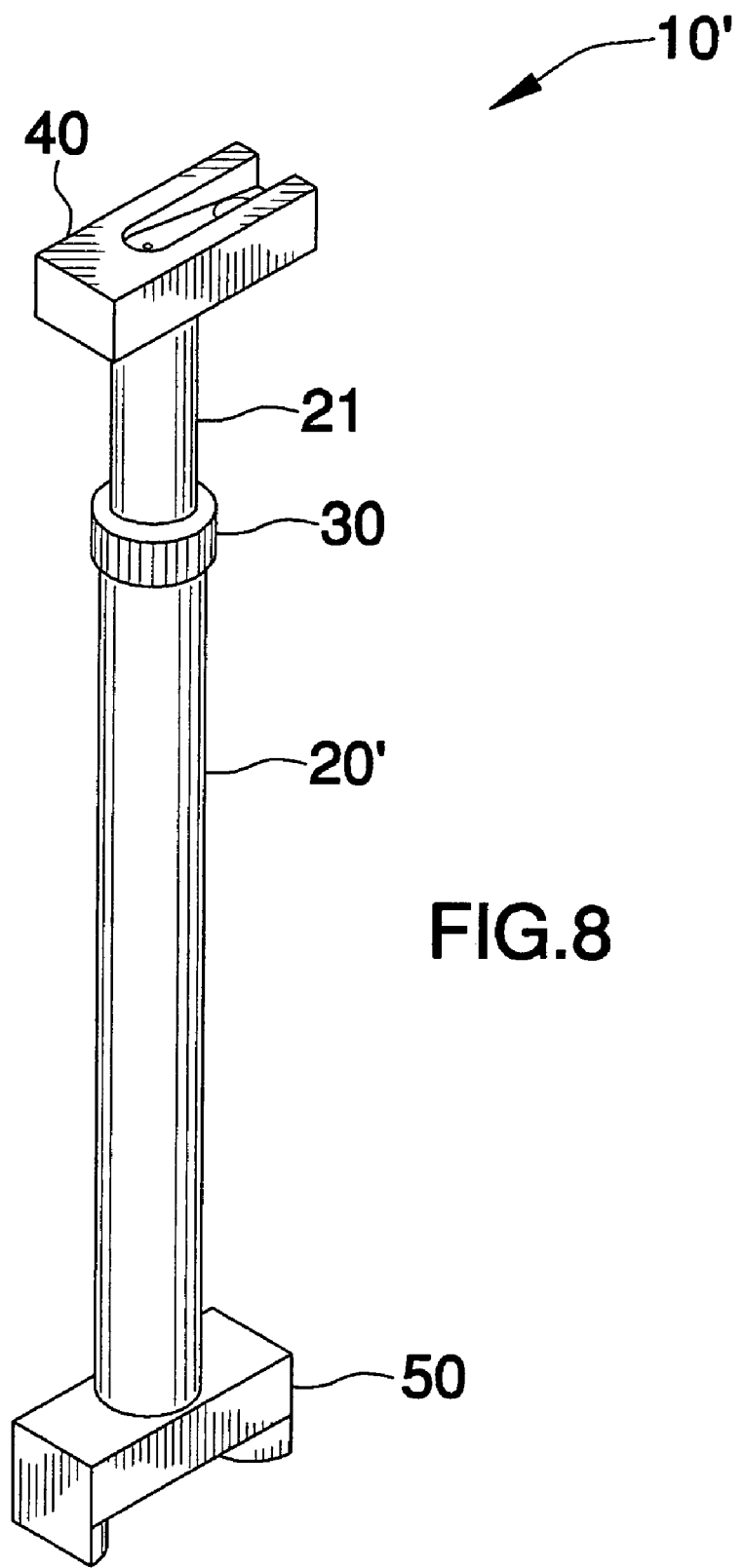
FIG. 8 is a perspective view showing an alternate embodiment of the present invention provided with a telescopic handle.

The apparatus 10 is preferably formed from non-corrosive material. Referring initially to FIGS. 1 and 8, a preferred embodiment the apparatus 10 includes a unitary elongated handle 20 that has a centrally disposed longitudinal axis and opposed end portions. In an alternate embodiment 10', the handle 20' preferably includes a telescopic portion 21 slidably engageable along the axis. Such a telescopic portion 21 includes a fastening member 30 radially spaced about the axis and selectively rotatable between clockwise and counterclockwise directions for tightening and loosening the telescopic portion 21 respectively. The telescopic portion 21 allows a user to extend the handle 20 when it is necessary to reach vents that disposed in hard-to-reach locations.

Figure 2:
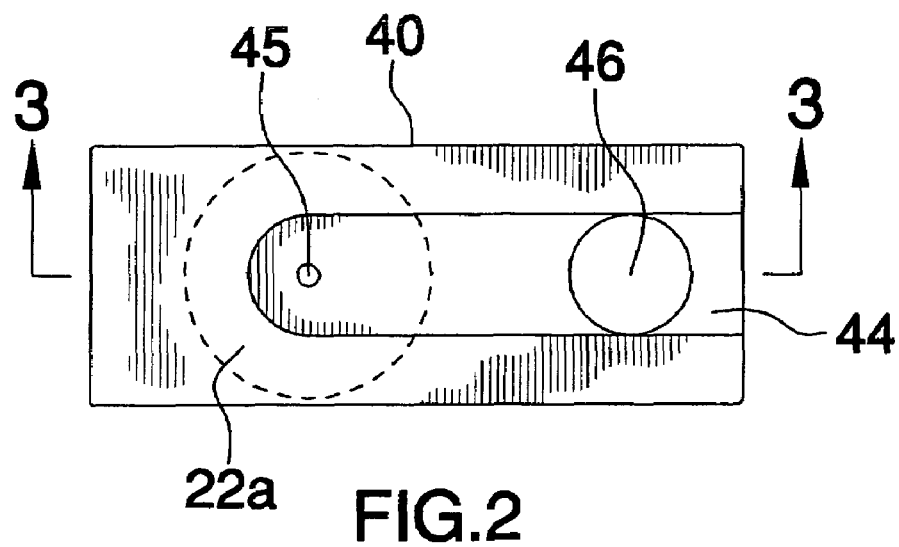
FIG. 2 is a top plan view of the first adaptor shown in FIG. 1.
Figure 3:
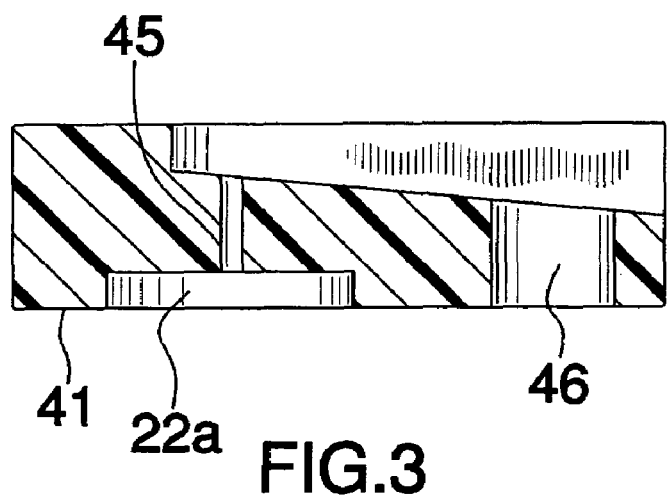
FIG. 3 is a cross-sectional view of the first adaptor shown in FIG. 2, taken along line 3—3.
Figure 4:
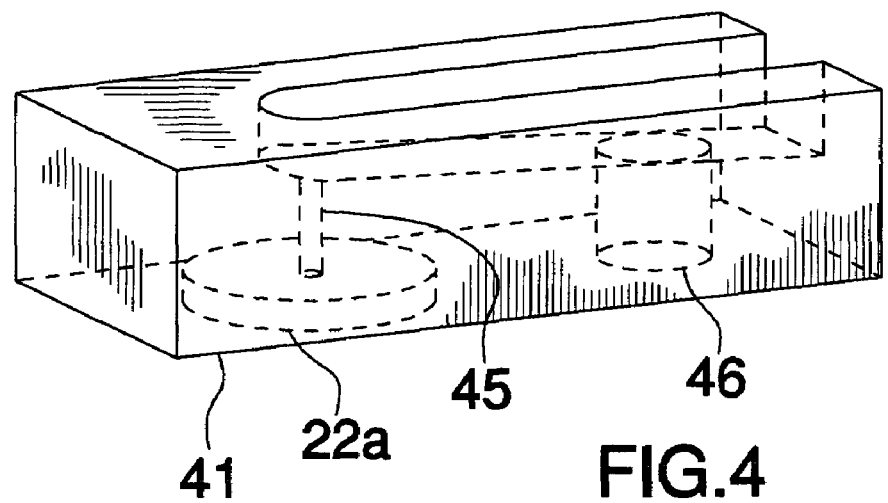
FIG. 4 is an enlarged perspective view of the first adaptor shown in FIG. 1.

Referring to FIGS. 1–3, the present invention advantageously includes a first adapter 40 provided with a substantially planar bottom surface 41 and a plurality of sidewalls integral therewith and extending vertically therefrom. Such a bottom surface 41 has an aperture 42 formed therein for securely receiving one opposed end portion 22a of the elongated handle 20.

The first adapter 40 further has a top surface 43 provided with a groove 44 formed substantially medially of the plurality of sidewalls and extending along a partial length of the first adapter 40. Such a groove 44 is sloped at a predetermined angle and extends downwardly and away from the handle 20. Of course, the groove slope may be selectively adjusted as necessary without departing from the true scope of the present invention.

Furthermore, the groove 44 has a first bore 45 formed therein and extending substantially parallel to the axis and downwardly from the first adapter 40 wherein the first bore 45 is in continuous contact medially of the bottom surface 41 and the aperture 42. The groove 44 further has a second bore 46 oppositely spaced from the first bore 45 and extending substantially parallel thereto wherein the second bore 46 passes through the bottom surface 41 of the first adapter 40 for engaging a select portion of an air vent during operating conditions.

Figure 5:
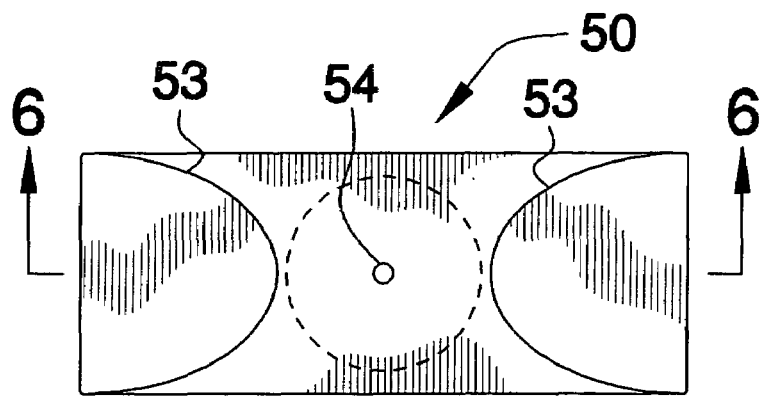
FIG. 5 is a bottom plan view of the second adaptor shown in FIG. 1.
Figure 6:
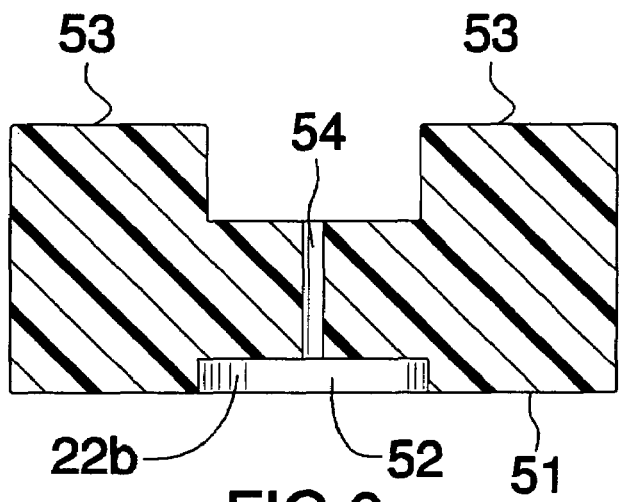
FIG. 6 is a cross-sectional view of the second adaptor shown in FIG. 5, taken along line 6—6.
Figure 7:
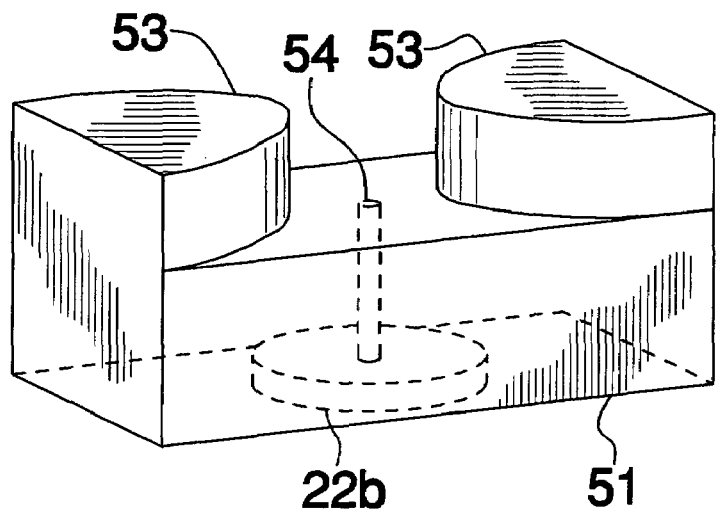
FIG. 7 is an enlarged perspective view of the second adaptor shown in FIG. 5.

Now referring to FIGS. 5–7, the present invention further includes a second adapter 50 that has a substantially planar top surface 51 and a plurality of sidewalls integral therewith and extending vertically therefrom. Such a top surface 51 is provided with an aperture 52 formed substantially medially therein for securely receiving another handle end portion 22b.

The second adapter 50 further has a bottom surface including a plurality of protrusions 53 extending downwardly therefrom. Such a plurality of protrusions 53 are oppositely spaced from the axis for selectively engaging another portion of an air vent during operating conditions. The plurality of protrusions 53 may have a substantially convex shape corresponding to a plurality of intrusions of a recreational vehicle fresh air vent, wherein the plurality of protrusions 53 each have an arcuate apex subjacent the handle 20. Of course, such protrusions 53 may be sized and shaped to accommodate a variety of vehicle air vents, as well known to a person of ordinary skill in the art.

The top surface 51 further includes a bore 54 formed substantially medially therein and extending substantially vertically, wherein the top surface bore 54 is in continuous contact with the second adapter receptacle. It is known that there are differences among the conventional vents found in recreational vehicles. Advantageously, the present invention accommodates such differences in terms of both handle length and vent design.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A vent adjusting apparatus for opening and closing fresh air vents of a recreational vehicle, said apparatus comprising:

an elongated handle having a centrally disposed longitudinal axis and opposed end portions;

a first adapter having a substantially planar bottom surface and a plurality of sidewalls integral therewith and extending vertically therefrom, said bottom surface further having an aperture formed therein for securely receiving one said opposed end portion of said elongated handle, said first adapter further having a top surface provided with a groove formed substantially medially of said plurality of sidewalls and extending along a partial length of said first adapter, said groove having a first bore formed therein extending substantially parallel to the axis and downwardly from said first adapter wherein said first bore is in continuous contact medially of said bottom surface and said aperture, said groove further having a second bore oppositely spaced from said first bore and extending substantially parallel thereto wherein said second bore passes through said bottom surface of said first adapter for engaging a select portion of an air vent during operating conditions; and a second adapter having a substantially planar top surface and a plurality of sidewalls integral therewith and extending vertically therefrom, said top surface being provided with an aperture formed substantially medially therein for securely receiving another said handle end portion, said second adapter further having a bottom surface including a plurality of protrusions extending downwardly therefrom, said plurality of protrusions being oppositely spaced from said axis for selectively engaging another portion of an air vent during operating conditions, said top surface further having a bore formed substantially medially therein and extending substantially vertically wherein said top surface bore is in continuous contact with a second adapter receptacle.

2. The apparatus of claim 1, wherein said plurality of protrusions have a substantially convex shape corresponding to a plurality of intrusions of a recreational vehicle fresh air vent.

3. The apparatus of claim 1, wherein said apparatus is formed from durable plastic material.

4. The apparatus of claim 1, wherein said elongated handle includes a telescopic portion slidably engageable along the axis, said telescopic portion further including a fastening member radially spaced about the axis and selectively rotatable between clockwise and counterclockwise directions for tightening and loosening said telescopic portion respectively.

5. The apparatus of claim 1, wherein said groove is sloped at a predetermined angle and extends downwardly and away from said handle.

6. The apparatus of claim 1, wherein said plurality of protrusions each have an arcuate apex subjacent said handle.

7. A vent adjusting apparatus for opening and closing fresh air vents of a recreational vehicle, said apparatus comprising:

an elongated handle having a centrally disposed longitudinal axis and opposed end portions;

a first adapter having a substantially planar bottom surface and a plurality of sidewalls integral therewith and extending vertically therefrom, said bottom surface further having an aperture formed therein for securely receiving one said opposed end portion of said elongated handle, said first adapter further having a top surface provided with a groove formed substantially medially of said plurality of sidewalls and extending along a partial length of said first adapter, said groove having a first bore formed therein and extending substantially parallel to the axis and downwardly from said first adapter wherein said first bore is in continuous contact medially of said bottom surface and said aperture, said groove further having a second bore oppositely spaced from said first bore and extending substantially parallel thereto wherein said second bore passes through said bottom surface of said first adapter for engaging a select portion of an air vent during operating conditions; and a second adapter having a substantially planar top surface and a plurality of sidewalls integral therewith and extending vertically therefrom, said top surface being provided with an aperture formed substantially medially therein for securely receiving another said handle end portion, said second adapter further having a bottom surface including a plurality of protrusions extending downwardly therefrom, said plurality of protrusions being oppositely spaced from said axis for selectively engaging another portion of an air vent during operating conditions, said top surface further having a bore formed substantially medially therein and extending substantially vertically wherein said top surface bore is in continuous contact with a second adapter receptacle, said plurality of protrusions having a substantially convex shape corresponding to a plurality of intrusions of a recreational vehicle fresh air vent.

8. The apparatus of claim 7, wherein said apparatus is formed from durable plastic material.

9. The apparatus of claim 7, wherein said elongated handle includes a telescopic portion slidably engageable along the axis, said telescopic portion further including a fastening member radially spaced about the axis and selectively rotatable between clockwise and counterclockwise directions for tightening and loosening said telescopic portion respectively.

10. The apparatus of claim 7, wherein said groove is sloped at a predetermined angle and extends downwardly and away from said handle.

11. The apparatus of claim 7, wherein said plurality of protrusions each have an arcuate apex subjacent said handle.

12. A vent adjusting apparatus for opening and closing fresh air vents of a recreational vehicle, said apparatus comprising:

an elongated handle having a centrally disposed longitudinal axis and opposed end portions, said elongated handle comprising a telescopic portion slidably engageable along the axis, said telescopic portion including a fastening member radially spaced about the axis and selectively rotatable between clockwise and counterclockwise directions for tightening and loosening said telescopic portion respectively;

a first adapter having a substantially planar bottom surface and a plurality of sidewalls integral therewith and extending vertically therefrom, said bottom surface further having an aperture formed therein for securely receiving one said opposed end portion of said elongated handle, said first adapter further having a top surface provided with a groove formed substantially medially of said plurality of sidewalls and extending along a partial length of said first adapter, said groove having a first bore formed therein and extending substantially parallel to the axis and downwardly from said first adapter wherein said first bore is in continuous contact medially of said bottom surface and said aperture, said groove further having a second bore oppositely spaced from said first bore and extending substantially parallel thereto wherein said second bore passes through said bottom surface of said first adapter for engaging a select portion of an air vent during operating conditions; and a second adapter having a substantially planar top surface and a plurality of sidewalls integral therewith and extending vertically therefrom, said top surface being provided with an aperture formed substantially medially therein for securely receiving another said handle end portion, said second adapter further having a bottom surface including a plurality of protrusions extending downwardly therefrom, said plurality of protrusions being oppositely spaced from said axis for selectively engaging another portion of an air vent during operating conditions, said top surface further having a bore formed substantially medially therein and extending substantially vertically wherein said top surface bore is in continuous contact with said second adapter receptacle, said plurality of protrusions having a substantially convex shape corresponding to a plurality of intrusions of a recreational vehicle fresh air vent.

13. The apparatus of claim 12, wherein said apparatus is formed from durable plastic material.

14. The apparatus of claim 12, wherein said groove is sloped at a predetermined angle and extends downwardly and away from said handle.

15. The apparatus of claim 12, wherein said plurality of protrusions each have an arcuate apex subjacent said handle.

* * * * *